Jan. 17, 1956  E. F. SVOBODA ET AL  2,730,909
MANUAL CONTROL FOR AUTOMATIC TRANSMISSIONS
Filed Sept. 1, 1951
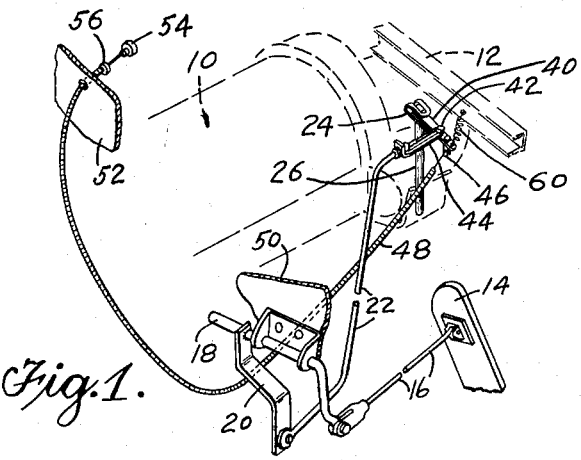
Fig. 1.
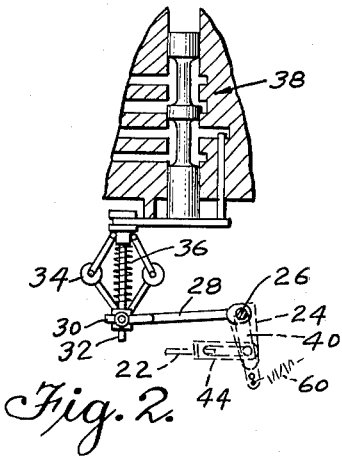
Fig. 2.
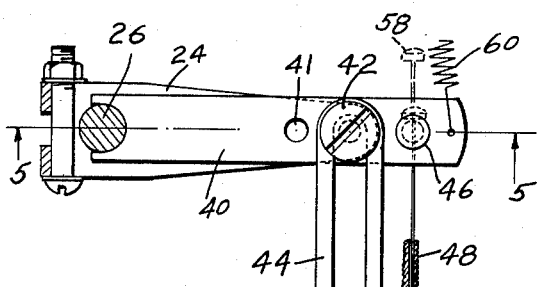
Fig. 3.
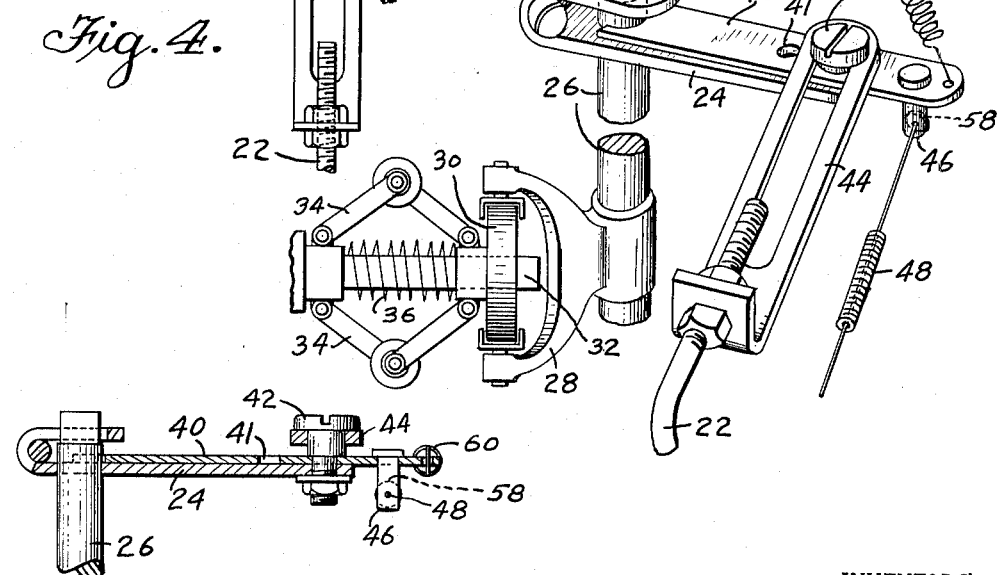
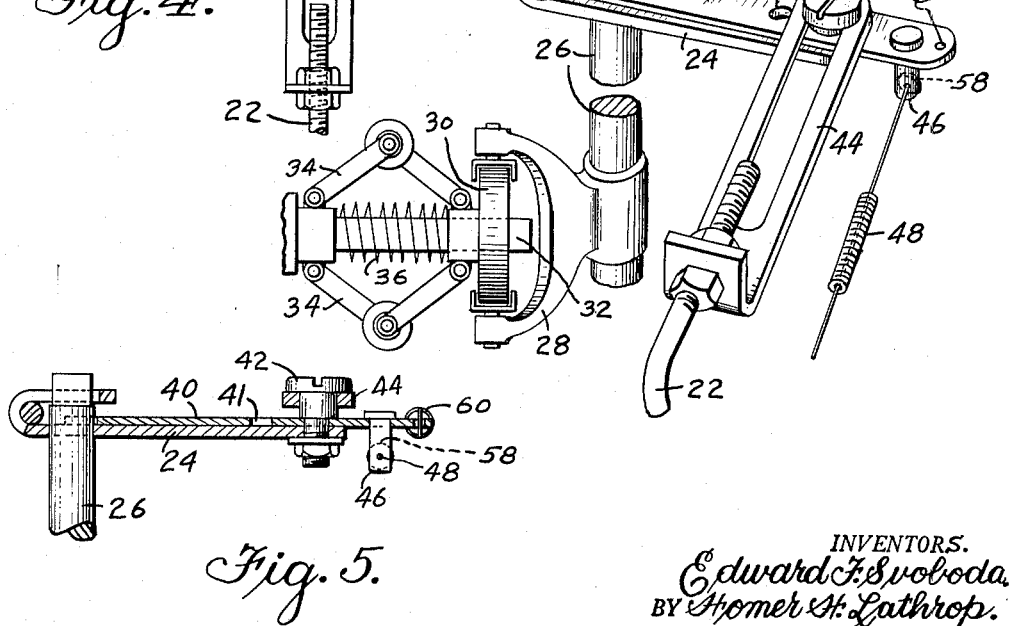
Fig. 4.
Fig. 5.
INVENTORS.
Edward F. Svoboda,
BY Homer H. Lathrop.
ATTORNEY.

United States Patent Office 2,730,909
Patented Jan. 17, 1956

2,730,909

MANUAL CONTROL FOR AUTOMATIC TRANSMISSIONS

Edward F. Svoboda and Homer H. Lathrop, Burbank, Calif.

Application September 1, 1951, Serial No. 244,828

8 Claims. (Cl. 74—472)

This invention relates to an improved manual control for automatic transmissions, and has for one of its principal objects the provision of a device which can be easily incorporated into one or more of the automatic transmissions for automobiles now on the market, and which will aid in simplifying the operation thereof.

One of the important objects of this invention is to provide a manual control for automatic transmissions for certain and various types of automobiles which can be employed for so regulating the automatic governor of such a transmission, whereby the transmission itself will be prevented from intermittently shifting from intermediate to a direct drive, when such intermittent shifting is undesirable, for example, when the car is climbing a steep hill or mountain.

It has been found that cars provided with certain types of automatic transmissions, will, when the car is being driven up a rather steep incline, shift from one driving speed to another in succession, which makes operation of the car difficult and unsatisfactory, not to mention the undue wear imposed upon the parts when such undesirable rapid intermittent shifting takes place.

It is, therefore, an object of the invention to incorporate an auxiliary structure into the throttle control of such certain types of transmissions, whereby the centrifugal governor can be held out of automatic operation of the control valves, particularly when the car is traveling at a relatively low rate of speed.

Yet another object of the invention is to provide a manual control for automatic transmissions for certain types of automobiles, whereby the same can be put into operation or shifted out of operation at will, and very simply.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective, semi-phantom view of the improved manual control for automatic transmissions of this invention, showing the same in operative position on such a representative transmission, and associated parts.

Figure 2 is a schematic view showing the centrifugal governor of such an automatic transmission and the associated valve control, together with a portion of the device of this invention applied thereto.

Figure 3 is an enlarged perspective view showing in more detail the manual control of this invention and illustrating its operative relationship with associated parts of the original mechanism.

Figure 4 is a top plan view of the control structure of this invention, illustrating the actual parts and showing the same in position on the throttle controlled arm of the transmission to which it is applied.

Figure 5 is a sectional view taken on the line 5—5 of Figure 4, looking in the direction indicated by the arrows.

As shown in the drawings:

The reference numeral 10 indicates generally an automatic transmission for automobiles to which the improved manual control of this invention can be applied. A portion of the chassis which supports the transmission housing is illustrated at 12. The foot pedal for the throttle control is shown at 14 and this is connected by links and arms 16 and 18 to the carburetor of the automobile motor in a conventional manner. A lever 20 is fastened to the shaft 18, and this in turn moves a rod or link 22, which is ordinarily connected to the end of an arm 24, and this in turn is fastened to the upper end of the shaft 26 leading into the interior of the transmission housing 10.

Affixed to the inner end of this shaft 26 is a yoke 28 (Figure 3) which supports a ball bearing or race 30, which in turn supports a shaft 32 upon which is mounted a centrifugal governor 34. The action of this governor is controlled by a helical spring 36, likewise mounted on the shaft 32.

The governor itself controls the operation of a valve assembly 38 as best shown in Figure 2, and the structure hereinabove described is that which is usual in this particular type of automatic transmission with the exception that the throttle controlled link 22 is directly connected to the end of the arm 24.

It has been found that automatic transmissions of this type will more or less rapidly and intermittently shift from intermediate to direct drive, particularly when a car is climbing a somewhat stiff grade in view of the fact that the governor is so adjusted as to automatically make this shift at speeds varying between twenty and forty miles per hour. It has further been found that it is more desirable to maintain this automatic transmission in an intermediate driving relationship when the car is on a relatively steep grade.

The apparatus of this invention will manually control the operation of the governor 34 so that this undesirable shifting back and forth will not take place at ordinary speeds, and to this end there is incorporated into the mechanism, and just above the arm 24, an auxiliary arm 40. This is provided with a semi-circular notch at one end, in order to embrace the upper end of the shaft 26, as best shown in Figures 3 and 4. A shoulder screw 42 passes through an opening in the arm 40 and fastens this end of the arm to the outer end of the arm 24. The head of this bolt is sufficiently spaced from the upper face of the arm 40 so as to allow of the slidable reception of a slotted extension 44, which is adjustably fitted onto the end of the throttle controlled link 22. Another hole 41 is provided for employment of this device with different models of cars.

A stud 46 is loosely mounted in another opening adjacent the end of the auxiliary arm 40, and the lower end of this stud is pierced with a hole, into which is slidably fitted the end wire of a flexible cable 48. This flexible cable is brought forwardly through the fire wall 50 of the automobile, then upwardly and finally rearwardly through an opening in the dash 52 of the car, terminating in a control knob 54. This flexible cable is attached for a push-pull relationship, and is provided with a locking means 56, whereby it can be releasably fastened in its retracted position as shown in Figure 1. A conventional head, button or the like 58 is provided on the innermost end of the wire 48 so that while it will slide freely in the stud 46, it cannot be pulled out of same. A tension spring 60 connects the outer end of the arm 40 to a convenient portion of the chassis 12 or to a floor-board or other convenient part.

It will thus be seen that a retraction of the knob 54 will pull the arms 40 and 24 in a clockwise direction, and this will cause a rotation of the shaft 26, a corresponding movement of the yoke 28 and a compression of the governor spring 36. Such a compression of the governor spring will so control the operation of the governor that an automatic shifting from intermediate to direct drive of the transmission mechanism will not take place until the car has attained a rather high speed, because the valve 38 will not then open at a lower speed.

At the same time, the throttle mechanism will operate freely, inasmuch as the slotted link 44, attached to the end of the throttle controlled rod 22, will be free to move with respect to the relatively locked arms 24 and 40.

In this position the car will be automatically maintained in an intermediate driving relationship, which is more desirable when a steep hill is encountered.

After the hill has been surmounted, the manual control can be readily released by turning the knob 54, releasing the latch 56 and either pushing in on the knob 54 to force the flexible cable to its original position, or otherwise allowing the spring 60 to perform this function.

The spring 60 is provided to assure that the mechanism returns to complete normal position when the cable 48 is shifted to decontrol position. Any position of the arms 24 and 40 between the two extremes will cause unsatisfactory driving operation.

Unless the control arm 40 is at one or other of the two extremes of its positions, the throttle arm and link 22 and 44 are liable to stick in operation, and, of course, the automatic shifting from one speed to another will be more frequent than if the governor is practically full retarded.

It will be seen that herein is provided a manual control for automatic transmissions which can be employed when the car is climbing a relatively steep grade, in order to eliminate undesirable frequent and intermittent shifting of the drive from intermediate to direct and which will also eliminate undesirable wear and tear on the valve control mechanism which accomplishes this shifting.

In this way, operation of the car will be rendered more easy and both experienced and inexperienced drivers will immediately appreciate the beneficial results.

It has been found that in climbing a grade in a car equipped with an automatic transmission, the direct drive will shift to intermediate when the pull on the motor arrives at a point just at a certain limit, and then if the operator gains speed, because of operation in intermediate drive, a shift to direct drive will again automatically take place, but this condition will not prevail very long if the grade continues steep when another shift will take place, and so on. Additionally, if the driver is forced to slow down because of traffic ahead, an automatic shifting will take place, regardless of grade. Sometimes it becomes desirable to have a speedy pick-up in order to pass slow moving traffic and this is often difficult if the car is in a direct drive relationship. With the manual control of this invention put into operation on a hill the transmission is always in intermediate drive and great flexibility of operation is immediately available. This, in addition to providing the economy already pointed out and also producing a better ease of operation, will further serve to prevent accidents.

The mechanism is simple, readily manufactured, easily applied and will practically never get out of order, while at the same time it will function immediately and properly whenever desired.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. In an automatic transmission for automobiles wherein the governor control shaft of said transmission extends beyond the casing thereof and includes an arm and link connection to the throttle of the automobile motor, a manual control for the governor comprising an additional arm adapted to be affixed to the governor control shaft and overlying the first named arm, means for moving both arms together for controlling the governor action, said means including a flexible cable terminating in the dash of the automobile, a control knob at that end of the cable, a slidable connection with the additional arm at the other end of the cable and a lost motion connector interposed between both arms and the throttle control of the automobile motor.

2. A device as described in claim 1, wherein said lost motion connection comprises a slotted link.

3. A device as described in claim 1, wherein said slidable connection at the end of the cable includes a stud loosely mounted in the end of the additional control arm.

4. A device as described in claim 3, wherein said stud has an opening therethrough for slidable movement of the end of the cable therein.

5. A device as described in claim 4, wherein a motion limiting stop is fixed on the outermost end of the cable.

6. A device as described in claim 2, wherein a shouldered bolt fastens both arms together.

7. A device as described in claim 6, wherein the shoulder of the bolt is positioned in the slot in the link.

8. A device as described in claim 1, wherein a spring connects the outer end of the additional arm to the chassis of the automobile for normally maintaining the control in inoperative position.

References Cited in the file of this patent

UNITED STATES PATENTS

| | | |
|---|---|---|
| Re. 23,356 | Aspinwall | Apr. 17, 1951 |
| 2,177,872 | Dunn | Oct. 31, 1939 |
| 2,185,730 | Griswold | Jan. 2, 1940 |
| 2,260,406 | Roche | Oct. 28, 1941 |
| 2,375,440 | Roche | May 8, 1945 |
| 2,443,084 | Rhodes | June 8, 1948 |
| 2,474,316 | May et al. | June 28, 1949 |
| 2,577,660 | Krueger | Dec. 4, 1951 |
| 2,611,281 | Gray et al. | Sept. 23, 1952 |